United States Patent Office 2,988,480
Patented June 13, 1961

2,988,480
THERAPEUTICALLY ACTIVE COMPOSITIONS
Ashton C. Cuckler, Westfield, N.J., assignor, by mesne assignments, to Merck & Co., Inc., Rahway, N.J., a corporation of New Jersey
No Drawing. Filed Oct. 21, 1952, Ser. No. 316,098
7 Claims. (Cl. 167—58)

The present invention relates to a new and improved therapeutic composition for the treatment of certain protozoan infections, and more particularly to a novel and highly effective pharmaceutical preparation designed for the treatment of *Trichomonas vaginalis* vaginitis.

*Trichomonas vaginalis*, a parasitic protozoan, primarily infests the human vagina and is the etiological agent of a very troublesome and prevalent form of vaginal infestation known as *Trichomonas vaginalis* vaginitis.

Various medicaments and methods of treatment have heretofore been employed in the treatment of *Trichomonas vaginalis* vaginitis, but all have been subject to numerous limitations and disadvantages. Organic acids such as acetic, lactic, and citric acids are commonly used but are characterized by very low trichomonadicidal action, and in many instances they fail satisfactorily to clear up the infestation, even when the therapy is continued for long periods of time. Silver picrate, another agent in common use, has good trichomonadicidal properties but is objectionable for it frequently gives rise to severe sensitizations, argyria and the like, and also because it produces aesthetically inacceptable stains. Phenyl mercuric nitrate or acetate are active trichomonadicidal compounds, but are reported to be unstable except at a limited pH range (7.4 to 7.6) which differs considerably from the pH of a human vagina moderately or heavily infested with *Trichomonas vaginalis*. Other preparations using various agents in powdered form such as boric acid, diiodoquinone, lactose, dextrose, and silver picrate, are commonly applied to an infested vagina by insufflation. However, vaginal insufflation of pregnant women has been reported to result in air embolisms and death, and this method is now seriously criticized and infrequently used. For these and other reasons, a more satisfactory trichomonadicide has long been desired.

The object of the present invention is to provide a new and improved therapeutic preparation and technique for the treatment of *Trichomonas vaginalis* vaginitis, with a view to obviating the disadvantages of the medicaments and modes of treatment heretofore employed.

A more particular object is the provision of a therapeutic composition characterized by high trichomonadicidal power and capable of giving symptomatic relief to patients suffering from *Trichomonas vaginalis* vaginitis without causing irritation of the human tissue to which the composition is topically applied.

Still another object is the provision of a composition which is free of any adverse side reactions upon the patient; is safe for home use by the patient following office treatment by the physician; is characterized by a high degree of efficacy in the treatment of *Trichomonas vaginalis* vaginitis; and is free of unaesthetic staining tendencies when used for the purpose intended.

Other objects and advantages of the invention will become apparent as the description progresses.

The foregoing objectives may be attained in accordance with the present invention which is based on the discovery that therapeutic formulations in the nature of creams and jellies containing 2-acylamino-5-nitrothiazole as active agents have trichomonadicidal activity of a high order and upon topical application to the vagina result in prompt relief from the symptoms of *Trichomonas vaginalis* vaginitis and a high incidence of cures. 2-acylamino-5-nitrothiazoles are represented by the general formula:

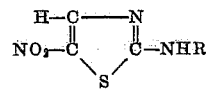

in which R is an acyl radical and preferably an acyl radical having not more than 12 carbon atoms. Acyl derivatives of 2-amino-5-nitrothiazole in which the acyl radical is acetyl, propionyl, butyryl, isobutyryl, caproyl, or lauroyl have been found particularly effective trichomonadicidal agents for use in the formulations of this invention.

The in vitro trichomonadicidal activity of 2-acylamino-5-nitrothiazoles has been demonstrated by a series of tests which established the minimal inhibitory concentration of these compounds. Minimal inhibitory concentration, as used above, is defined as the minimal concentration of a trichomonadicidal compound capable of preventing the growth of, as well as the killing of *Trichomonas vaginalis* organisms introduced into a culture medium, capable alone of supporting a vigorous growth of the organisms, and containing the trichomonadicidal compound to be tested. The culture medium used of the tests is described in a publication of Kupferberg, Johnson and Sprince, Proceedings of the Society for Experimental Biology and Medicine, volume 67, pages 304–308, 1948.

In making the tests to determine minimal inhibitory concentrations, 0.05 ml. of a 48-hour culture of *Trichomonas vaginalis* was placed in a series of tubes containing 10 ml. of the culture medium and increasing amounts of the compound to be tested. The inoculated culture medium was then incubated at 37° C. for nine days and examined under magnification after two, five, seven, and nine days. The minimal inhibitory concentration of the compound tested is that concentration in the tube in which no viable organisms are present at the ninth day examination. If there are no viable organisms present on examination at a time less than nine days, the concentration of compound is greater than minimal and if there are viable organisms present at the ninth day examination, the concentration is less than minimal. The results of the tests involving 2-acylamino-5-nitrothiazole compounds with the unacylated amine 2-amino-5-nitrothiazole are given in the table below

| Compound | Minimal Inhibitory Concentration, gamma per cc. |
|---|---|
| 2-amino-5-nitrothiazole | 13.80 |
| 2-acetylamino-5-nitrothiazole | 0.33–1.20 |
| 2-propionylamino | 2.30 |
| 2-butyrylamino | 0.47–0.94 |
| 2-caproylamino | 0.93 |
| 2-iso-caproylamino | 1.80 |
| 2-lauroylamino | 1.10 |

In employing the trichomonadicides in the present invention, for the treatment of *Trichomonas vaginalis* vaginitis, one or more of the active agents are uniformly distributed in a suitable chemotherapeutic vehicle that is chemically compatible with the particular trichomonadicide selected, non-inhibiting with respect to the action of the effective agent upon *Trichomonas vaginalis* and essentially non-injurious to the vaginal mucosa under the conditions of use. Since it is desirable to avoid the previously mentioned hazards arising from the insufflation of powdered materials, the vehicle is preferably of a liquid or semi-liquid type. Furthermore, since the final preparation should be readily miscible with vaginal fluids, the vehicles, whether hydrous or anhydrous, are preferably water-miscible or water-dispersible. The compositions of this invention may be in the form of suppositories, if desired.

The foregoing criteria for a vehicle in which 2-acyl-amino-5-nitrothiazole is incorporated may be met by a large number of semi-liquid chemotherapeutic vehicles that are well known in the art. Thus, for example, the vehicle may comprise semi-liquids that are colloidal in nature, especially those that are viscous and/or mucilaginous in character. Such vehicles are particularly suitable for use in tropical treatment of Trichomonas vaginalis vaginitis because of their inherent gelatinous and miscible nature which affords prolonged contact between medicament and the infecting organism. A further and more important reason for the use of 2-acylamino-5-nitrothiazole in a vehicle of this type is based on the discovery that the trichomonadicidal activity of a dispersion of these active agents in such vehicles is substantially greater than an aqueous solution of the same agents.

2-acetylamino-5-nitrothiazole is soluble in water to the extent of about one part in 50,000 by weight and the pH of the solution is 5.6 but if the pH is adjusted to 7, the solubility is increased tenfold.

Simultaneous determinations of the minimal inhibitory concentrations of 2-acetylamino-5-nitrothiazole in aqueous solution and in the formulation of Example I were determined according to the above method. 2-acetylamino-5-nitrothiazole in aqueous solution and in the formulation of Example I were found to have minimal inhibitory concentrations of one part in three million and one part in ten million respectively.

Oil and water types of emulsions or creams as well as aqueous jellies such as those prepared with the aid of any of a number of commonly used jelling agents, including acacia, tragacanth, bentonite, alginic acid and the like, are particularly suitable vehicles for the purposes of this invention. The preferred vehicle is a viscous, aqueous gel containing one or more cellulose derivatives such as methyl cellulose, hydroxyethyl cellulose, and sodium carboxy methyl cellulose, although very satisfactory results have also been obtained when the jelling agent is pectin, gum tragacanth, sodium alginate, and the like vegetable jelling agents.

In order more clearly to disclose the nature of the present invention, several specific examples will hereinafter be described in considerable detail. It should be understood that these are presented solely for purposes of illustration and not with the object of either delineating the scope of the invention or restricting the breadth of the appended claims.

The trichomonadicidal formulations of Examples I through IV, are prepared according to the following general procedure in which two initial solutions are mixed to make the formulation, all the parts being given by weight.

To prepare Solution A, dissolve the para-hydroxy-benzoic acid in about two-thirds of the hot deionized water, cool to about 170° F. and, while stirring, add the gel-forming ingredient and glycerine or propylene glycol.

To prepare Solution B, add the trichomonadicidal agent to the remainder of the deionized water. The pH is adjusted to the desired value. The formulation is prepared by adding Solution B to Solution A in a slow stream with good stirring; stirring is continued for at least one hour.

*Example I*

| | |
|---|---|
| Deionized water | 76.20 |
| Sodium carboxymethylcellulose | 3.00 |
| Polyethyleneglycol (molecular weight approximately 4000) | 15.00 |
| Propylene glycol | 5.00 |
| Para-hydroxy-benzoic acid methyl ester | 0.20 |
| 2-acetylamino-5-nitrothiazole | 0.25 |

*Example II*

| | |
|---|---|
| Deionized water | 90.30 |
| Methyl cellulose | 3.50 |
| Glycerin | 5.00 |
| Para-hydroxy-benzoic acid methyl ester | 0.20 |
| 2-propionylamino-5-nitrothiazole | 1.00 |

*Example III*

| | |
|---|---|
| Deionized water | 80.80 |
| Pectin | 8.00 |
| Propylene glycol | 10.00 |
| Para-hydroxy-benzoic acid methyl ester | 0.10 |
| Para-hydroxy-benzoic acid propyl ester | 0.10 |
| 2-valeroylamino-5-nitrothiazole | 1.00 |

*Example IV*

| | |
|---|---|
| Deionized water | 90.55 |
| Tragacanth | 3.25 |
| Glycerin | 5.00 |
| Para-hydroxy-benzoic acid methyl ester | 0.20 |
| 2-lauroylamino-5-nitrothiazole | 1.00 |

*Example V*

| | |
|---|---|
| Deionized water | 73.00 |
| Glyceryl monostearate | 9.00 |
| Stearic acid | 6.00 |
| Peanut oil | 5.00 |
| Glycerin | 5.00 |
| Triethanolamine | 0.50 |
| 2-acetylamino-5-nitrothiazole | 1.50 |

The trichomonadicidal formulation of Example V in which all the parts are given by weight, is prepared by heating a mixture of the oleaginous ingredients, stearic acid, glyceryl monostearate, and peanut oil, until they are in a liquid state. This thoroughly mixed material is added at 70° F. to a major amount of the deionized water at 70° F. containing the glycerin and triethanolamine in solution. This mixture is thoroughly agitated at 70° F. until a cream-like emulsion is formed. The trichomonadicidal agent dissolved in the deionized water left over from the first mixture is then added to the above mixture in a slow stream with good stirring; stirring is continued for at least an hour.

2-acylamino-5-nitrothiazole may be present in the formulations of the above examples in amounts ranging from about ⅕% to about 1½% by weight and still be highly effective in the treatment of Trichomonas vaginalis vaginitis. However, it is preferred that the trichomonadicidal agents be present in an amount within the range of about ⅖% to about 1%. The formulation may be adjusted to a pH within the range of from 4.0 to 7.5 but the pH should not be substantially below 4.0 or substantially above 7.5, because a formulation having a pH outside this range will have some irritating effect on vaginal mucosa.

The chemotherapeutic compositions in accordance with the present invention are preferably applied to the vagina by means of a vaginal applicator of sufficient length that the formulation may be placed evenly from the posterior fornix to the introitus. Approximately 5 cc. of the material is placed within the vagina per application, and a small amount is topically applied to the external genitalia.

A group of thirty-three adult women having Trichomonas vaginalis vaginitis were treated with the formulation of Example I. There was some variance in symptoms: thirty-one of the patients complained of discharge ranging from moderate to severe. Twenty-three complained of itching, soreness, chafing, or burning upon urination. Inspection of the vaginal introitus in some instances revealed a variable amount of vaginal discharge which was seropurulent, frothy, and malodorous. The discharge in several was so profuse that it escaped over the perineum and inner aspects of the thighs and macerated the skin, producing intertrigo. Examination by insertion of the speculum in several instances could not be accomplished due to severe pain caused by vaginal inflammation. The vaginal mucosa was seen in some patients to be speckled with numerous small punctate hemorrhagic spots.

All thirty-three patients received by vaginal applicator two doses daily of five grams each of the formulation of Example I, one given at bedtime, the second being administered upon awakening in the morning. This treatment was carried out for a period of 14 days for a total of twenty-eight applications.

All patients were seen 0 to 12 days after termination of treatment. Of the thirty-three patients, twenty-six were asymptomatic with complete relief from their original symptoms. Of the remaining seven patients, five showed moderate to marked symptomatic relief, with one showing no improvement. One patient was discharged from the hospital before data could be obtained.

To determine irritation and toxicity effects, a series of twelve women received vaginally a daily dose of the formulation of Example I containing 100 mgs. of the active component for a period of eight weeks. Vaginal examination and history revealed no irritation due to medication, while blood studies showed no significant changes in red blood cells, white blood cells and haemoglobin.

It will be apparent to those skilled in the art that numerous variations, modifications, and extensions of the principles involved may be made without departing from the spirit and scope of the invention. Thus, for example, the pharmaceutical vehicles employed in the various examples are merely illustrative and it will be apparent that many other vehicles, such as creams and gels, may be used in place of those illustrated in the examples. Likewise, acyl derivatives of 2-amino-5-nitrothiazole other than those specifically mentioned may be used either singly or in combination. All such variations, modifications, and extensions are to be understood as included within the ambit of the appended claims.

What is claimed is:

1. A therapeutically active composition for topical application comprising a trichomonadicidal compound of the formula

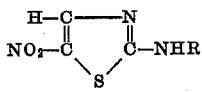

wherein R is an acyl radical having not more than 12 carbon atoms, substantially uniformly distributed in a water-dispersible cellulose derivative selected from the class of methyl cellulose, hydroxyethyl cellulose, and sodium carboxy methyl cellulose.

2. A composition according to claim 1 in which the cellulose derivative is sodium carboxy methyl cellulose.

3. A therapeutically active composition for topical application comprising a trichomonadicidal compound of the formula

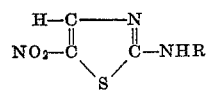

wherein R is an acyl radical having not more than 12 carbon atoms, substantially uniformly distributed in a water-dispersible cellulose derivative selected from the class of methyl cellulose, hydroxyethyl cellulose, and sodium carboxy methyl cellulose, said trichomonadicidal compound being present in the composition to the extent of ⅕% to 1½% by weight.

4. A therapeutically active composition for topical application comprising 2-acetylamino-5-nitrothiazole, substantially uniformly distributed in a water dispersible cellulose derivative selected from the class of methyl cellulose, hydroxy ethyl cellulose, and sodium carboxy methyl cellulose.

5. A therapeutically active composition for topical application comprising 2-acetylamino-5-nitrothiazole, substantially uniformly distributed in an aqueous dispersion of sodium carboxy methyl cellulose.

6. A method of combatting *Trichomonas vaginalis* vaginitis which comprises applying to the infected regions a composition comprising at least about 0.20 percent of a trichomonadicidal compound of the formula

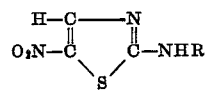

wherein R is an acyl radical having not more than twelve carbon atoms.

7. A method of combatting *Trichomonas vaginalis* vaginitis which comprises applying to the so-infected human vagina a composition comprising a trichomonadicidal compound of the formula

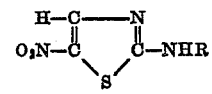

wherein R is an acyl radical having not over eight carbon atoms.

References Cited in the file of this patent

UNITED STATES PATENTS

| 2,484,035 | Johnson | Oct. 11, 1949 |
| 2,511,838 | Folsome | June 20, 1950 |
| 2,531,756 | Waletzky | Nov. 28, 1950 |

OTHER REFERENCES

Smith: J.A.M.A., Oct. 23, 1943, pp. 481–483.